United States Patent [19]
Mallick et al.

[11] Patent Number: 5,805,916
[45] Date of Patent: Sep. 8, 1998

[54] METHOD AND APPARATUS FOR DYNAMIC ALLOCATION OF REGISTERS FOR INTERMEDIATE FLOATING-POINT RESULTS

[75] Inventors: Soummya Mallick; Michael Putrino; Romesh Mangho Jessani, all of Austin, Tex.

[73] Assignees: International Business Machines Corporation, Armonk, N.Y.; Motorola, Inc., Schaumburg, Ill.

[21] Appl. No.: 758,017

[22] Filed: Nov. 27, 1996

[51] Int. Cl.$^6$ .................................................... G06F 9/38
[52] U.S. Cl. ...................... 395/800.23; 395/563; 395/393
[58] Field of Search ............................... 395/800.23, 563, 395/393, 382, 391, 395; 364/748.14, 748.01

[56] References Cited

U.S. PATENT DOCUMENTS

| | | | |
|---|---|---|---|
| 5,386,375 | 1/1995 | Smith ................................. | 364/748.06 |
| 5,465,373 | 11/1995 | Kahle et al. ......................... | 395/800.23 |
| 5,584,037 | 12/1996 | Papworth et al. .................. | 395/800.23 |
| 5,646,875 | 7/1997 | Taborn et al. ...................... | 364/748.4 |

*Primary Examiner*—Larry D. Donaghue
*Attorney, Agent, or Firm*—Liddell, Sapp, Zivley, Hill & LaBoon, L.L.P.; Michael A. Davis, Jr.

[57] ABSTRACT

The present invention relates to a multiple stage execution unit for executing instructions in a microprocessor having a plurality of rename registers for storing execution results, an instruction cache for storing instructions, each instruction being associated with a rename register, a sequencer unit for providing an instruction to the execution unit, and a data cache for providing data to the execution unit. In one version, the execution unit includes a first stage which generates an intermediate result from the data according to an instruction; a means for providing a first portion of the intermediate result to an intermediate register; a means for providing a second portion of the intermediate result to a rename register associated with the instruction; a means for passing the first portion from the intermediate register to a second stage of the execution unit; a means for passing the second portion from the rename register to the second stage of the execution unit; wherein the second stage of the execution unit operates on the first and second portions according to the instruction.

13 Claims, 4 Drawing Sheets

METHOD AND APPARATUS FOR DYNAMIC ALLOCATION OF REGISTERS FOR INTERMEDIATE FLOATING-POINT RESULTS

TECHNICAL FIELD

This patent application relates in general to the field of microprocessor architecture, and more particularly, to a method and apparatus useful in floating-point operations.

BACKGROUND OF THE INVENTION

Current microprocessors support large instruction sets having numerous different types of instructions. Execution of these instructions is performed by execution units provided on the processor. In order to increase performance, some processors, referred to as superscaler processors, are provided with multiple execution units which are capable of operating in parallel with each other. Examples of execution units typically provided on a superscaler processor include fixed point units, complex fixed point units, load/store units, branch units and floating-point units. Since these execution units are capable of operating in parallel with each other, multiple instructions may be issued during each clock cycle. The execution results of the execution units are shared with each other in various ways depending on the architecture of the processor.

Some instructions require more than one clock cycle to execute. One class of instructions which typically require more than one clock cycle to execute, are floating-point instructions. Various floating-point conventions have been utilized by different computer manufacturers in the past. For purposes of the present application, reference is made to the IEEE-754 Standard for binary floating-point arithmetic which defines conventions for 64 and 32 bit floating point arithmetic.

FIG. 1 is a block diagram of a floating-point execution unit 30. The floating-point unit 30 includes a multiply stage 302, an add stage 306, and a normalization/round stage 310. These stages perform independently of each other and, therefore, allow the execution of the instruction to be performed in stages. Specifically, during the first clock cycle, an instruction is provided to multiply stage 302 on input bus 300. After the instruction is operated on by multiply stage 302, the result, sometimes referred to as the "partial product" with respect to floating-point operations, is written to two intermediate registers 304 and 305. During the second clock cycle, a second instruction is provided to multiply stage 302 while the previous result stored in intermediate registers 304 and 305 is provided to the add stage 306. At the end of the second clock cycle, the result of the operation by add stage 306 is written to intermediate register 308 and the result from the operation of multiply stage 302 is written to intermediate registers 304 and 305. During the third clock cycle, a third instruction is provided to multiply stage 302 which operates, along with add stage 306, substantially as before. The result from the previous operation of add stage 306 is provided to normalization/round stage 310 from intermediate register 308. Normalization/round stage 310 is the last stage required to complete execution of the first instruction. Therefore, at the end of the third clock cycle, the final result of the floating-point operation on the first instruction is written into a rename register block 38 which holds the result for use by other execution units provided on the processor, or for a writeback into floating-point architecture registers. In subsequent clock cycles, the second and third instructions will complete in a fashion similar to that of instruction one.

One shortcoming of the floating-point unit 30 shown in FIG. 1 is that the stages must be coupled by intermediate registers 304, 305 and 308. For floating-point instructions, these registers must be well over 100 bits wide, and therefore, require a great deal of semiconductor area for their fabrication. Moreover, this problem is compounded in superscaler processors which may have multiple floating-point units, each of which requires a plurality of these extremely large intermediate registers for operation.

Accordingly, it is an object of the present invention to overcome the above described problems and to provide further improvements and advantages which will become apparent in view of the following disclosure.

SUMMARY OF THE INVENTION

One aspect of the invention relates to a method for operating a multiple stage execution unit in a microprocessor which has a plurality of rename registers, each of which is associated with an instruction to be executed. In one embodiment, the method comprises the steps of generating an intermediate result in a first stage of the execution unit according to an instruction; storing a first portion of the intermediate result of the first stage of the execution unit in an intermediate register; storing a second portion of the intermediate result of the first stage of the execution unit in a rename register; retrieving the first portion from the intermediate register and providing it to a second stage of the execution unit; and retrieving the second portion of the intermediate result from the rename register and providing it to the second stage of the execution unit.

Another aspect of the invention relates to a multiple stage execution unit for executing floating-point instructions in a microprocessor which has a plurality of rename registers, each instruction being associated with the rename register. In one embodiment, the execution unit comprises means for providing floating-point data to a first stage of the execution unit to generate an intermediate result from the floating-point data according to an instruction; means for providing a first portion of the intermediate result to an intermediate register; means for providing a second portion of the intermediate result to a rename register associated with the instruction; means for passing the first portion from the intermediate register to a second stage of the execution unit; and means for passing the second portion from the rename register to the second stage of the execution unit; wherein the second stage of the execution unit operates on the first and second portions according to the instruction.

Still a further aspect of the invention relates to a multiple stage execution unit for executing instructions in a microprocessor having a plurality of rename registers for storing execution results, an instruction cache for storing instructions, each instruction being associated with a rename register, a sequencer unit for providing an instruction to the execution unit, and a data cache for providing data to the execution unit, the execution unit comprising a first stage which generates an intermediate result from the data according to an instruction; means for providing a first portion of the intermediate result to an intermediate register; means for providing a second portion of the intermediate result to a rename register associated with the instruction; means for passing the first portion from the intermediate register to a second stage of the execution unit; means for passing the second portion from the rename register to the second stage of the execution unit; wherein the second stage of the execution unit operates on the first and second portions according to the instruction.

DETAILED DESCRIPTION OF EMBODIMENTS OF THE INVENTION

Figure 1:
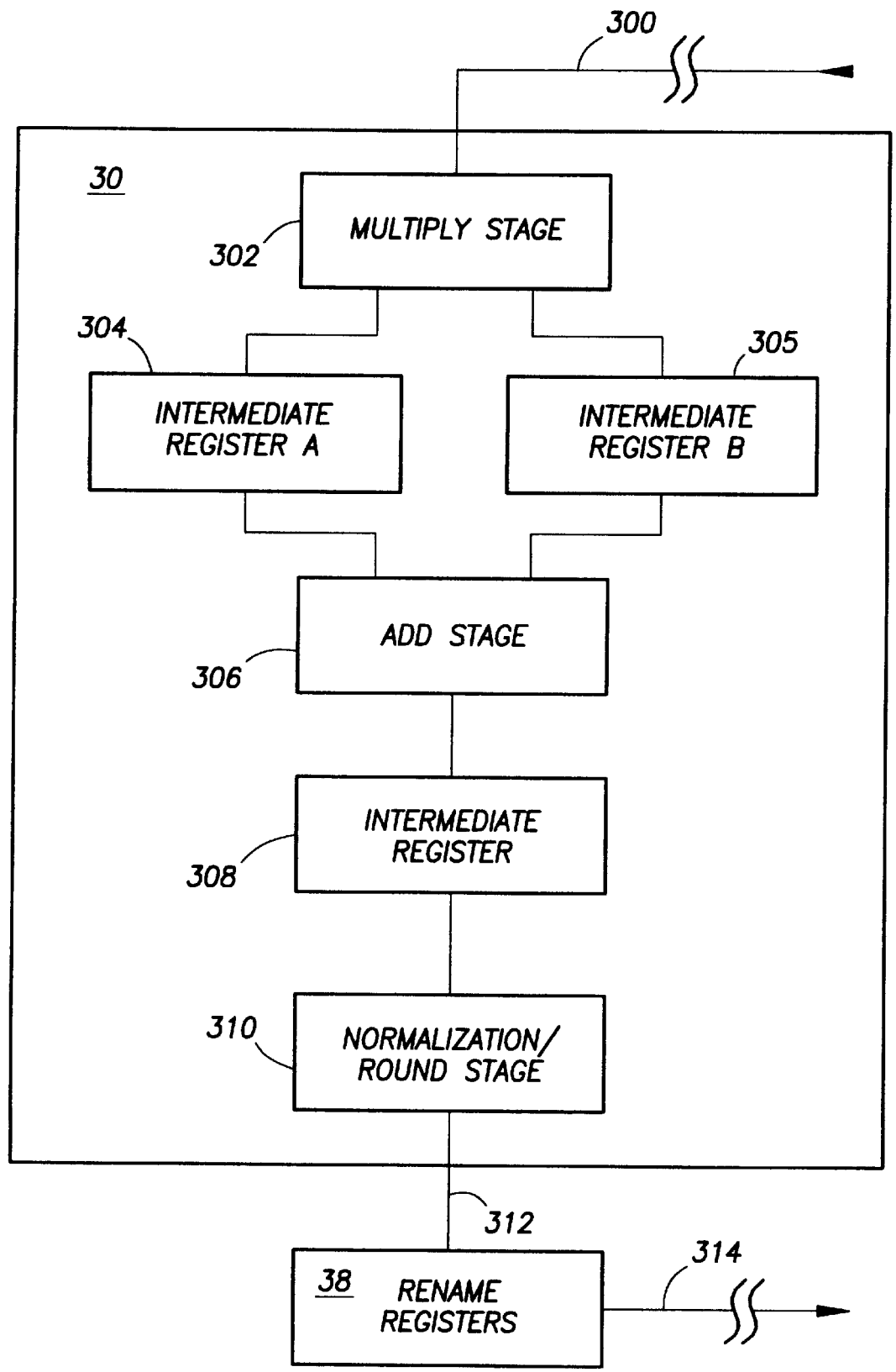
FIG. 1 is a block diagram of a conventional floating-point unit.
Figure 2:
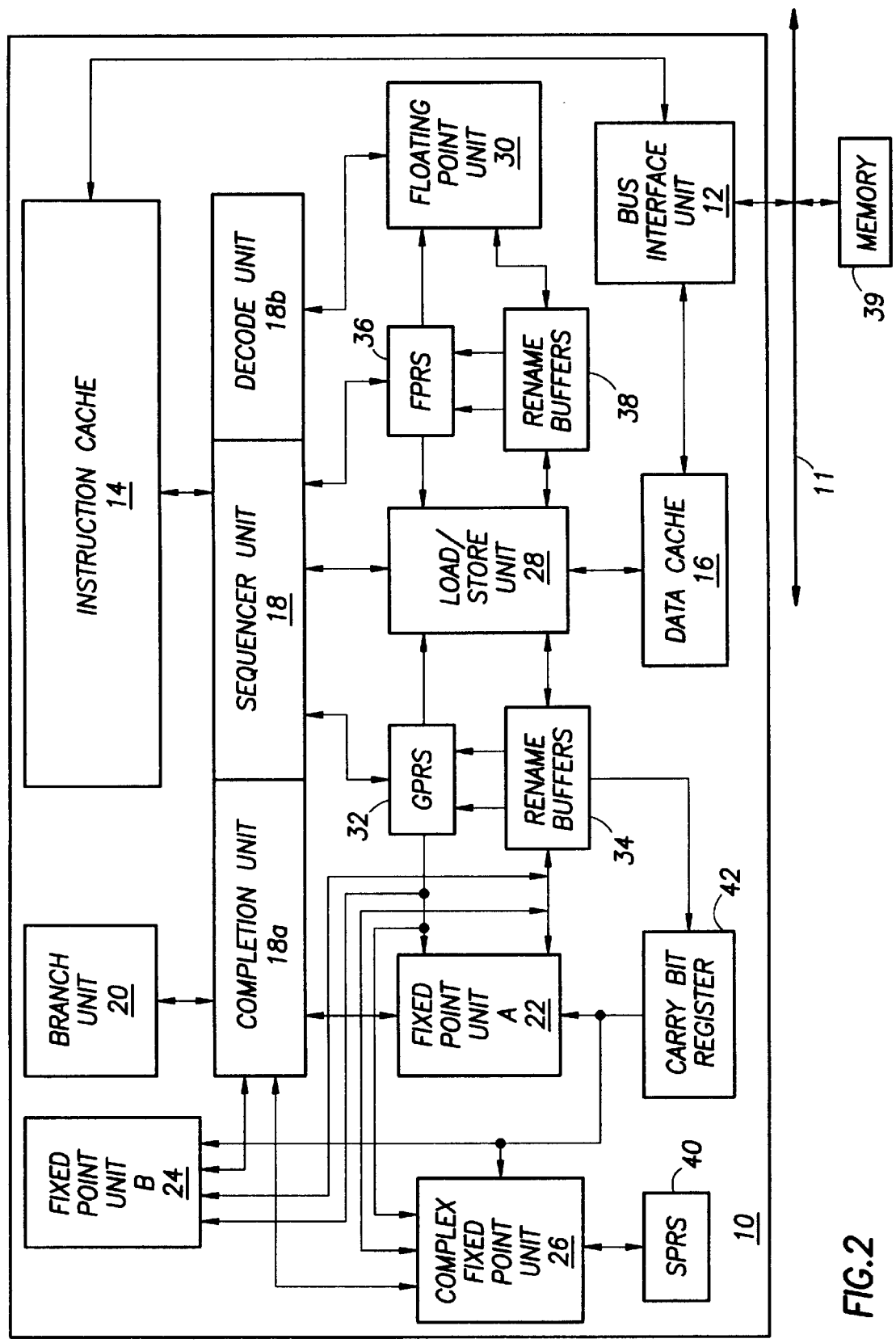
FIG. 2 is a block diagram of a processor having a floating-point unit according to an embodiment of the invention.

FIG. 2 is a block diagram of a processor 10 system for processing information according to an embodiment of the invention. In this embodiment, processor 10 is a single integrated circuit superscaler microprocessor. Accordingly, as discussed further hereinbelow, processor 10 includes various units, registers, buffers, memories, and other sections, all of which are formed by integrated circuitry. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating-point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating-point architectural registers ("FPRs") 36 and floating-point rename buffers 38. FPU 30 outputs results (destination operand information) of its operation for storage at selected entries in floating-point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 includes completion unit 18a and decode/dispatch unit 18b. The decode/dispatch unit 18b provides the logic for decoding instructions and issuing them to the appropriate execution unit. The dispatch logic also allocates each instruction to the appropriate execution unit. A reorder buffer entry is allocated for each instruction, and dependency checking is done between the instructions in the dispatch queue. The rename buffers are searched for the operands as the operands are fetched from the register file. Operands that are written by other instructions ahead of the one in the dispatch queue are given the tag of that instructions rename buffer; otherwise, the rename buffer or register file supplies either the operand or a tag. As instructions are dispatched, a fetch unit is notified that the dispatch queue can be updated with more instructions. Completion unit 18a retires executed instructions from the reorder buffer in the completion unit and updates register files and control registers. The completion unit recognizes exception conditions and discards any operations being performed on subsequent instructions in program order. The completion unit can quickly remove instructions from a mispredicted branch, and the dispatch unit begins dispatching from the correct path. The instruction is retired from the reorder buffer when it has finished execution and all instructions ahead of it have been completed. The instructions result is written into the appropriate register file and is removed from the rename buffers at or after completion. At completion, other resources affected by this instruction are updated.

When decode/dispatch unit 18b dispatches an instruction to an execution unit, the same instruction, along with tags representing the instruction number, a target rename buffer, and the operand source, is simultaneously dispatched to the completion unit 18a. The completion unit 18a maintains the order in which the instructions are dispatched in a first-in first-out ("FIFO") buffer. Completion unit 18a monitors the valid bits associated with the rename registers. When an execution unit sets a valid bit of a rename register to indicate that the rename register contains valid information, the corresponding instruction in the FIFO buffer of the completion unit is marked as finished. If there are no unfinished instructions in the FIFO buffer ahead of the finished instruction, then the completion unit 18a writes the result of the finished instruction back to the architectural registers. If there are unfinished instructions ahead of the finished instruction in the FIFO buffer then the completion unit 18a waits until they are also finished before "writeback" to the architectural register is performed. This prevents the possible "writeback" of erroneous data in case one of the unfinished instruction results in an exception.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating-point operations on source operands, such as floating-point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining" as discussed previously. An instruction is normally processed as six stages, namely fetch, decode, dispatch, execute, completion, and "writeback".

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Figure 3:
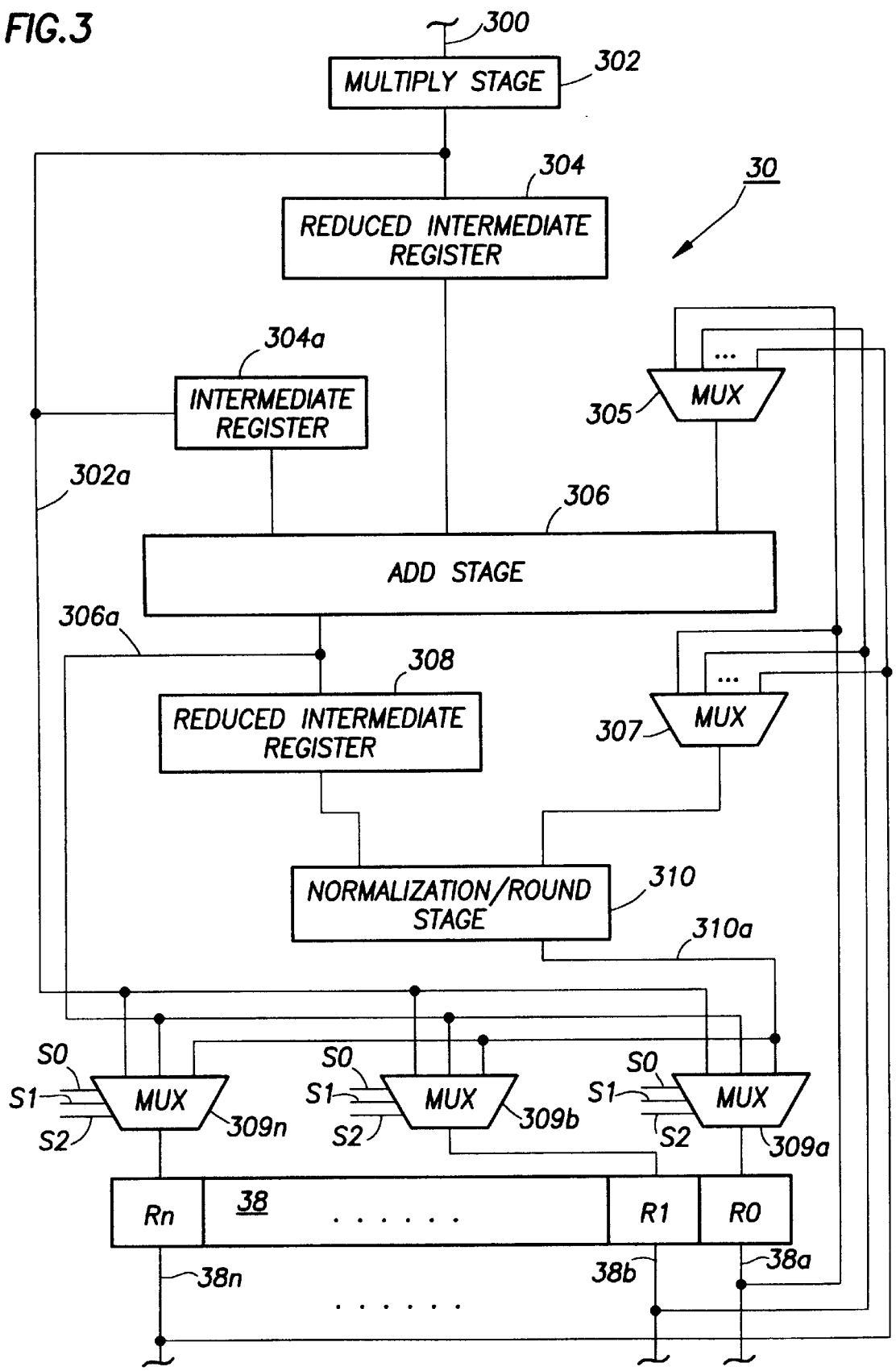
FIG. 3 is a block diagram of a floating-point unit according to an embodiment of the invention.

FIG. 3 is a block diagram of a floating-point unit 30 according to an embodiment of the invention. Floating-point unit 30 comprises multiply stage 302, add stage 306 and normalization/round stage 310. The operation of these stages is conventional, except that, rather than receiving input from wide intermediate registers as before, add stage 306 receives data from reduced with intermediate register 304, intermediate register 304a and multiplexer 305, while normalization/round stage receives data from reduced intermediate register 308 and multiplexer 307.

In operation, the embodiment shown in FIG. 3 makes use of the dynamic allocation of the rename registers to allow storage of a portion of the execution results of each stage 302 and 306 of the floating-point execution unit 30.

Specifically, each instruction provided to the floating-point unit 30 by the instruction bus 300, has an associated ID number. One function performed by the ID number is to allow the instruction to be identified with a particular rename register R0–Rn of rename register block 38 for the storage of the final execution results of the instruction.

Rename registers R0–Rn each have an associated validity bit. The validity bit operates to inform other execution units, and the completion unit, on the microprocessor whether the particular rename register contains valid data. When a validity bit for a particular register is high, the register is said to contain valid data, and the data is available for use by any other execution unit on the processor 10 or to be completed by the completion unit. However, when a validity bit for a particular register is low, the register does not contain valid data, and therefore, any other execution unit which requires the execution results scheduled to be placed in that register must wait for the validity bit to go high. This effectively "locks out" other processors from reading data from the particular rename register before execution of the instruction is complete. Of course, other techniques for managing rename registers are well known in the art and examples are described in Mike Johnson, "Super Scaler Microprocessor Design," Prentice-Hall, Inc. (1991), particularly pages 107–112, incorporated herein by reference. In another version of the invention, rename register block 38 is replaced by a series of rename register busses each of which includes a keeper, or latch, circuit for temporary holding of data. An example of a suitable rename bus system is described in U. S. Pat. No. 5,465,373, Kahle et al., incorporated herein by reference.

When an instruction is issued to floating-point unit 30, the validity bit of the rename register associated with that particular instruction is set low, indicating that the rename register does not yet contain valid information. The floating-point execution unit 30 tracks the progress of each instruction through the various stages 302, 306 and 310. When an instruction is complete at the end of the normalization/round stage 310, the execution results are written into the rename register associated with the instruction ID, and the validity bit of the register is raised high. This indicates that the execution of the instruction is complete, and the results are available for use by other execution units on the processor or an indicator to the completion unit to writeback to the architectural registers.

Of course, it will be understood, that, depending on the instruction, multiple clock cycles may be required for its execution. For example, in the embodiment of FIG. 3, it is noted that each instruction requires three clock cycles to execute, one for each stage. In the conventional floating-point unit shown in FIG. 1, the rename register for a particular instruction is idle for these three clock cycles, until the execution of the instruction is complete. However, in the present invention, a portion of the intermediate result from one stage is multiplexed into the rename register associated with the instruction being executed. This portion of the intermediate result is provided from the rename register to the subsequent stage on the following clock cycle. This allows the size of the intermediate registers to be reduced, as will be described in greater detail herein.

In the embodiment of the invention illustrated in FIG. 3, portions of the intermediate results from multiply stage 302 and add stage 306 are multiplexed by multiplexers 309a–309n into the rename registers associated with the instructions. Multiplexers 309a–309n are conventional 3:1 multiplexers, each one being associated with a particular rename register.

The select lines of a particular one of multiplexers 309a–309n are responsive to the rename register associated with an instruction ID and the various stages of floating-point unit 30. For example, if instruction 01 is assigned to rename register R1 then at the completion of multiply stage 302 select line S0 of multiplexer 309b is raised high, causing data from data line 302a to be written into register R1.

The instruction ID is pipelined along with the instruction data through each stage of the execution unit 30. Thus, the execution unit 30 is able to determine the target rename register for the intermediate result of any of the stages, and activate the appropriate select line on the particular one of multiplexers 309a–309n which corresponds to the target rename register in question.

It will be apparent to those skilled in the art that the intermediate results from the execution stages of the floating point execution unit 30 are wider than the rename registers. For example, with reference to the instruction set implemented in the POWERPC architecture, the instruction for a double-precision floating point multiply-add ("fmadd") operates to multiply two floating point numbers stored in the floating point register file. Each of these floating point numbers requires a register 64 bits wide to store.

In the first clock cycle, the decoded instruction, fmadd, along with the required operands, is passed to multiply stage 302 which performs the initial function of multiplying the two operands together. At the end of this stage, the intermediate result, i.e., the partial product in this particular case, produced by multiply stage 302 requires two large registers for storage. For example, a register 106 bits wide is needed to store the fractional part, i.e., a fraction field alone. Of course, the rename registers are only as wide as the registers of the floating point register file, i.e., 64 bits. Therefore, it is clear that the entire result of multiply state 302 cannot be stored in a rename register.

However, the rename register can be used to store up to 64 bits of the intermediate result. In one version of the invention, 64 bits of the 106 bit fraction field are stored, at the end of each stage, into the rename register associated with the particular instruction being executed. This allows the registers for storing the fraction field of the intermediate result of multiply stage 302 to be reduced to 42 bits.

Once a portion of the intermediate result from an execution stage is written into a rename register, then, on the next clock cycle, this portion must read from the register and passed to the subsequent stage, along with the contents of the reduced intermediate stage register, for proper execution of the instruction. Referring again to the example discussed above, recall that the portion of the result from multiply stage 302 of instruction 01 is stored in register R1. On the following clock cycle, this data is provided to multiplexer 305 which passes it to add stage 306. The data from multiplexer 305 is combined with the data from intermediate register 304a and reduced intermediate instruction register 304 by add stage 306 and executed.

Similarly, on the following clock cycle the intermediate result of add stage 306 is provided to reduced intermediate register 308 and register R1. On the next clock cycle, the intermediate result of add stage 306 is provided to normalization/round stage 310 from reduced intermediate register 308 and register R1 via multiplexer 307. When the operation of normalization/round stage 310 is complete, the final 64-bit result is written to R1 and the validity bit is set to indicate R1 contains valid data.

Multiplexers 305 and 307, in this embodiment, are conventional n:1 multiplexers. As discussed previously, the instruction ID for each instruction is pipelined through each stage of the execution unit 30. The instruction ID allows any stage of the execution unit 30 to associate the target rename register for a particular instruction with the appropriate stage of the execution unit 30. This information is used to operate the select lines (not shown) of multiplexers 305 and 307 to ensure that the appropriate data from rename register block 38 is passed to the correct stage of the execution unit 30.

When an instruction completes normalization/round stage 310, the final 64-bit result is generated and output on data line 310a which provides the final result to multiplexers 309a–309n, and then into the appropriate rename register R0–Rn. At this point, the data contained in the corresponding rename register, is valid and may be read by other functional units on the processor, or passed to the floating point register file 36 as illustrated in FIG. 2.

It will be appreciated by those with skill in the art that, although the present invention has been described with respect to floating point operations, alternate embodiments are possible in other execution units which require more than one clock cycle to execute, for example, multi-cycle fixed point multiply operations. It is to be understood that in such other embodiments, the size and number of intermediate registers between the stages will depend on the specific execution unit to which the present invention is applied.

Figure 4:
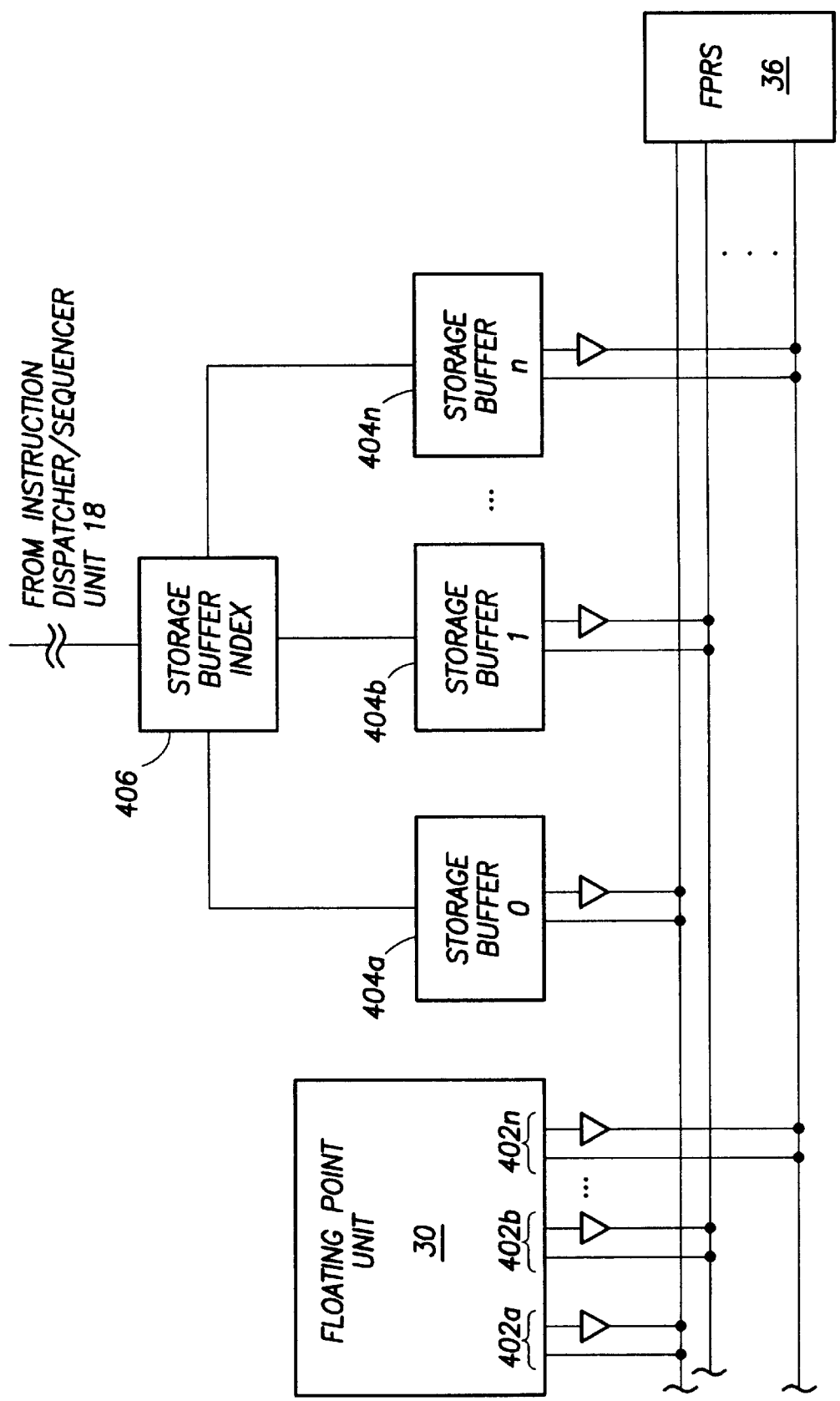
FIG. 4 is a block diagram of a floating-point unit according to a further embodiment of the invention.

Referring now to FIG. 4, another embodiment of the invention is shown in which the rename register block 38 is replaced by a rename bus. In this embodiment, the output from multiplexers 309a–309n and data lines 38a–38n are coupled to a series of read and write busses 402a–402n. Each of these busses is coupled to one of storage buffers 404a–404n. In this manner, floating point unit 30 can read or write data to any of storage buffers 404a–404n which provide the temporary storage formerly provided by the rename register block 38. Storage buffer index 406 keeps track of the storage buffer associated with a particular instruction ID. Information concerning the instruction ID's is provided from the dispatcher/sequencer unit 18. When an instruction is completed, the valid data on one of data busses 402a–402n may be written into the floating point register file 36 as shown. It will also be understood that data from floating point register file 36 may also be read by floating point unit 30 via busses 402a–402n.

All patents, patent applications and other publications discussed herein are hereby incorporated by reference as though set forth in full. While the invention has been particularly shown and described with reference to various embodiments, it will be understood by those skilled in the art that various changes in form and detail may be made therein without departing from the scope and spirit of the present invention.

What is claimed is:

1. A method for operating a multiple stage execution unit for executing instructions in a microprocessor having a plurality of rename registers, each instruction being associated with a rename register, the method comprising:

generating an intermediate result in a first stage of the execution unit according to an instruction;

storing a first portion of the intermediate result of the first stage of the execution unit in an intermediate register;

storing a second portion of the intermediate result of the first stage of the execution unit in a rename register;

retrieving the first portion from the intermediate register and providing it to a second stage of the execution unit;

retrieving the second portion of the intermediate result from the rename register and providing it to the second stage of the execution unit.

2. A method as in claim 1 wherein providing a second portion of the intermediate result comprises providing the second portion to a multiplexer coupled to the rename register.

3. A method as in claim 1 wherein providing the first portion and the second portion to a second stage comprises providing the second portion to a multiplexer coupled to the second stage.

4. A multiple stage execution unit for execution floating-point instructions in a microprocessor having a plurality of rename registers, each instruction being associated with a rename register, the execution unit comprising:

means for providing floating-point data to a first stage of the execution unit to generate an intermediate result from the floating point data according to an instruction;

means for providing a first portion of the intermediate result to an intermediate register;

means for providing a second portion of the intermediate result to a rename register associated with the instruction;

means for passing the first portion from the intermediate register to a second stage of the execution unit;

means for passing the second portion from the rename register to the second stage of the execution unit;

wherein the second stage of the execution unit operates on the first and second portions according to the instruction.

5. A multiple stage execution unit as in claim 4 wherein a width of the intermediate register is less than a width of the intermediate result.

6. A multiple stage execution unit as in claim 4 wherein the means for providing the second portion of the intermediate result to a rename register comprises a multiplexer coupled between the first stage and the rename register.

7. A multiple stage execution unit as in claim 4 wherein the means for passing the second portion from the rename register comprises a multiplexer coupled between the rename register and the second stage of the execution unit.

8. A multiple stage execution unit as in claim 4 wherein the rename register comprises a rename bus accessible by the execution unit and a plurality of floating-point architecture registers.

9. A multiple stage execution unit for executing instructions in a microprocessor having a plurality of rename registers for storing execution results, an instruction cache for storing instructions, each instruction being associated with a rename register, a sequencer unit for providing an instruction to the execution unit, and a data cache for providing data to the execution unit, the execution unit comprising:

a first stage which generates an intermediate result from the data according to an instruction;

means for providing a first portion of the intermediate result to an intermediate register;

means for providing a second portion of the intermediate result to a rename register associated with the instruction;

means for passing the first portion from the intermediate register to a second stage of the execution unit;

means for passing the second portion from the rename register to the second stage of the execution unit;

wherein the second stage of the execution unit operates on the first and second portions according to the instruction.

10. A multiple stage execution unit as in claim 9 wherein a width of the intermediate register is less than a width of the intermediate result.

11. A multiple stage execution unit as in claim 9 wherein the means for providing the second portion of the intermediate result to a rename register comprises a multiplexer coupled between the first stage and the rename register.

12. A multiple stage execution unit as in claim 9 wherein the means for passing the second portion from the rename register comprises a multiplexer coupled between the rename register and the second stage of the execution unit.

13. A multiple stage execution unit as in claim 9 wherein the rename register comprises a rename bus accessible by the execution unit and a plurality of floating-point architecture registers.

* * * * *